(12) United States Patent
Bree et al.

(10) Patent No.: US 6,247,373 B1
(45) Date of Patent: Jun. 19, 2001

(54) METHOD FOR DETERMINING SEALING FORCE FROM CINCHING TIME

(75) Inventors: Gary David Bree, Clarkston; William L. Priest, Royal Oak; Kevin W. Wright, Detroit, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/475,332

(22) Filed: Dec. 30, 1999

Related U.S. Application Data

(60) Provisional application No. 60/136,541, filed on May 28, 1999.

(51) Int. Cl.[7] .............................. G01L 1/26; G01N 19/00
(52) U.S. Cl. ...................................... 73/862.381; 73/865.9
(58) Field of Search .............................. 73/760, 774, 805, 73/862.381, 862.621, 862.636, 865.9; 292/210, 211

(56) References Cited

U.S. PATENT DOCUMENTS

| | | | |
|---|---|---|---|
| 4,982,984 | * 1/1991 | Yokota et al. ........................ | 296/201 |
| 5,899,508 | * 5/1999 | Cetnar et al. ........................ | 292/216 |
| 5,918,917 | * 7/1999 | Elton et al. ........................ | 292/201 |
| 6,053,542 | * 4/2000 | Ostrowski et al. .................. | 292/201 |

\* cited by examiner

*Primary Examiner*—Max Noori
(74) *Attorney, Agent, or Firm*—Patrick M. Griffin

(57) ABSTRACT

A method for determining whether the cable sealing force for a vehicle door cinching assembly exceeds a maximum limit. The method includes the steps of: determining a maximum cinching time corresponding to a predetermined maximum tolerable sealing force for cinching a vehicle door type from a partially-latched position to a fully-latched position; determining the time necessary to cinch the particular vehicle door from a partially-latched position to a fully-latched position; comparing the determined time with the maximum cinching time that corresponds to the predetermined maximum force; and generating an output indicating if the determined time exceeds the maximum cinching time.

9 Claims, 5 Drawing Sheets

METHOD FOR DETERMINING SEALING FORCE FROM CINCHING TIME

This appln claims the benefit of Provisional No. 60/136,541 filed May 28, 1999.

TECHNICAL FIELD

The present invention relates to cable cinching assemblies for vehicle door latches, and more particularly to methods for testing the magnitude of forces acting on a cinching mechanism's cable during cinching.

BACKGROUND OF THE INVENTION

Vehicle doors occasionally include electro-mechanical cinching assemblies to fully close or "cinch" a door from a partially-latched position (i.e. secondary) to a fully-latched position (i.e. primary). These cinching assemblies are useful on van doors, for example. There are several ways to effect cinching. It can be done, for example, as part of a power sliding door operation with a power sliding door mechanism. One example of this is shown in U.S. Pat. No. 5,138,795 to Compeau et al. Cinching can also be done with a cinching mechanism that has the sole purpose of cinching the door from the secondary position to the primary position regardless of how the door came to be in the secondary position (e.g. through manual or power means).

In operation, a controller disposed on the vehicle senses when the door is in the secondary position. When this happens, the controller initiates cinching by activating some type of cable drive. The cable drive pulls on the cable, which in turn drives the door from the secondary position to the primary position.

In the ideal situation, the cable drive exerts a force on the cable that falls within a predetermined normal operating range for the cable and the vehicle. But it is possible to have a condition where the cable drive must exert an unusually strong force on the cable in order to fully cinch the door. This can happen under several different circumstances including, for example, the case where the door trim is not properly positioned. There are various reasons why one desires to have the cable force necessary to cinch the door below a certain level. For example, if the vehicle's battery voltage dips down somewhat, it may not have sufficient voltage to the cinch the door. Also, because the cable's life is inversely related to the forces acting on it, one wants to ensure that the forces are not too high.

Until now, there has been no easy way to test the force acting on a given vehicle's cinching cable without disassembling the vehicle to some extent.

SUMMARY OF THE INVENTION AND ADVANTAGES

The method for determining whether the sealing force exceeds a maximum limit includes the following steps: 1) determining a maximum cinching time corresponding to a predetermined maximum tolerable sealing force for cinching a vehicle door type from a partially-latched position to a fully-latched position; 2) determining the time necessary to cinch the particular vehicle door from a partially-latched position to a fully-latched position; 3) comparing the determined time with the maximum cinching time that corresponds to the predetermined maximum force; and 4) generating an output indicating if the determined time exceeds the maximum cinching time.

The present invention allows for easy testing of the cable seal force to see if it exceeds a predetermined maximum. This gives the vehicle manufacturer the opportunity to test vehicles before they leave the factory, and make necessary adjustments to the vehicle if the measured force exceeds the maximum. Dealers and other service facilities can likewise test the force on the cable when servicing a given vehicle.

FIGURES IN THE DRAWINGS

The present invention will now be described, by way of example, with reference to the accompanying drawings, in which.

DESCRIPTION OF THE PREFERRED EMBODIMENT

Referring to the Figures wherein like numerals indicate like or corresponding parts through the several views, a method is described for determining whether the sealing force for a particular vehicle door cinching mechanism exceeds a maximum limit.

Figure 1A:
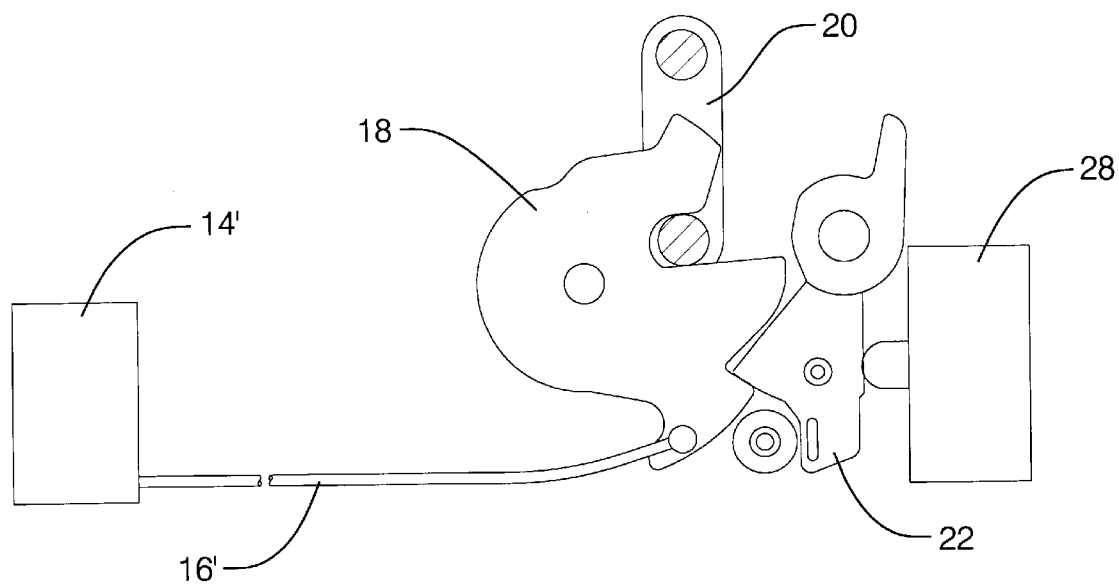
FIG. 1A is a simplified view of a door latch in the secondary, or partially-latched, position.
Figure 1B:
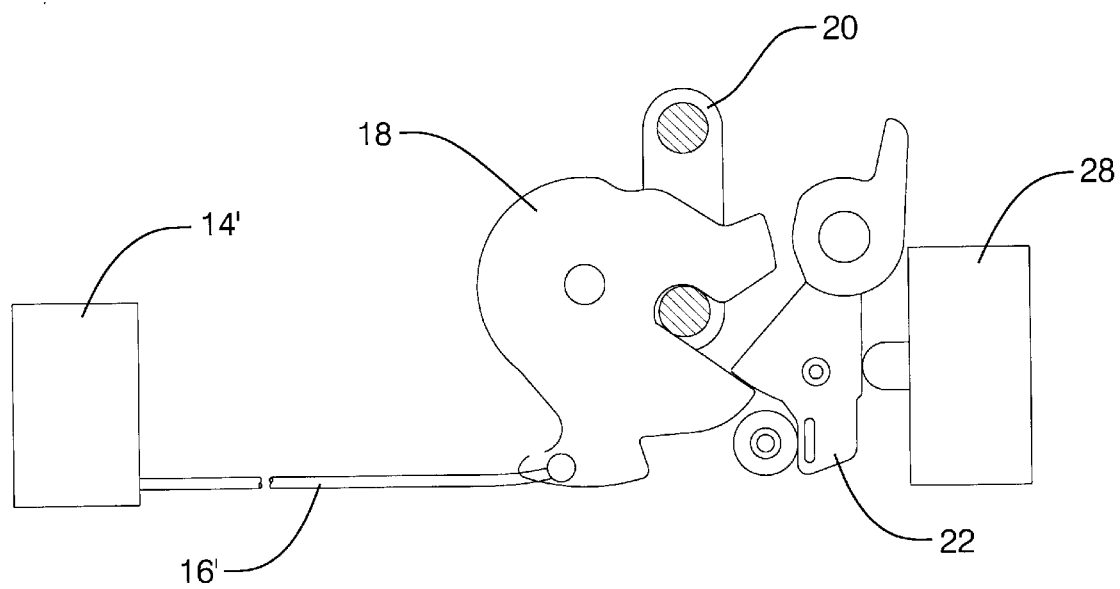
FIG. 1B is a simplified view of the door latch having been drawn into the primary, or fully-latched position by one embodiment of a cable cinching mechanism.
Figure 2:
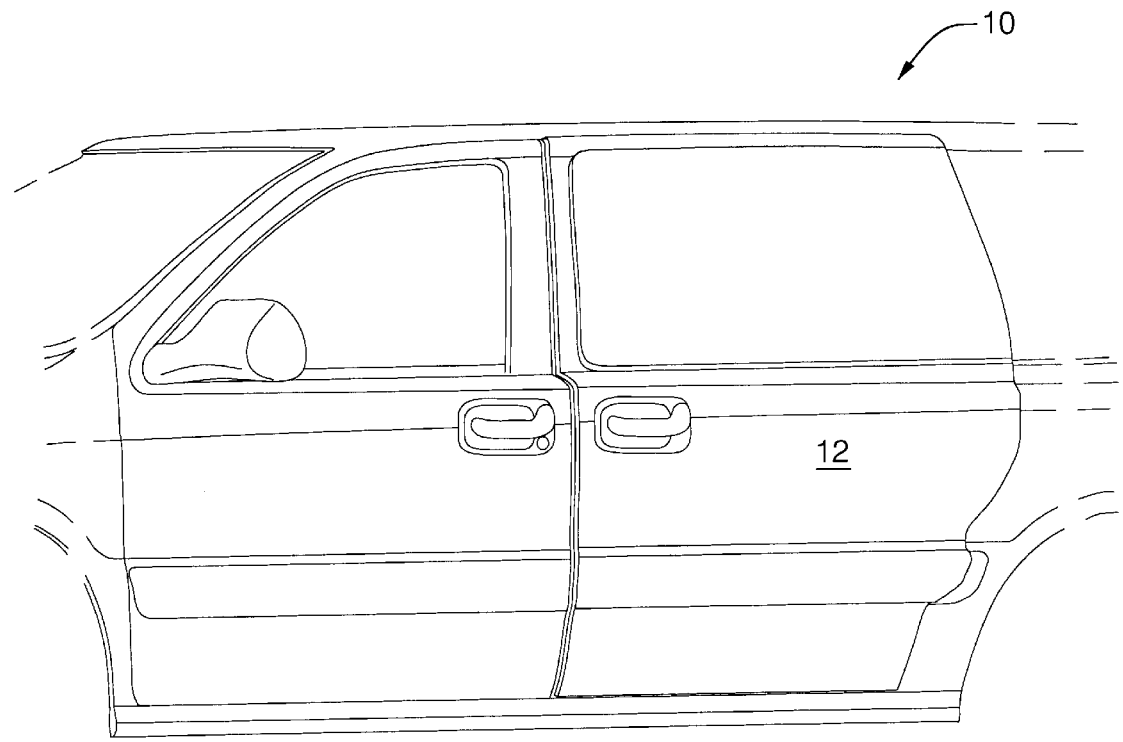
FIG. 2A is a perspective view of a van door showing the door in a secondary position.
FIG. 2B is a perspective view of a van door showing the door after it has been moved into the primary position.
Figure 2:
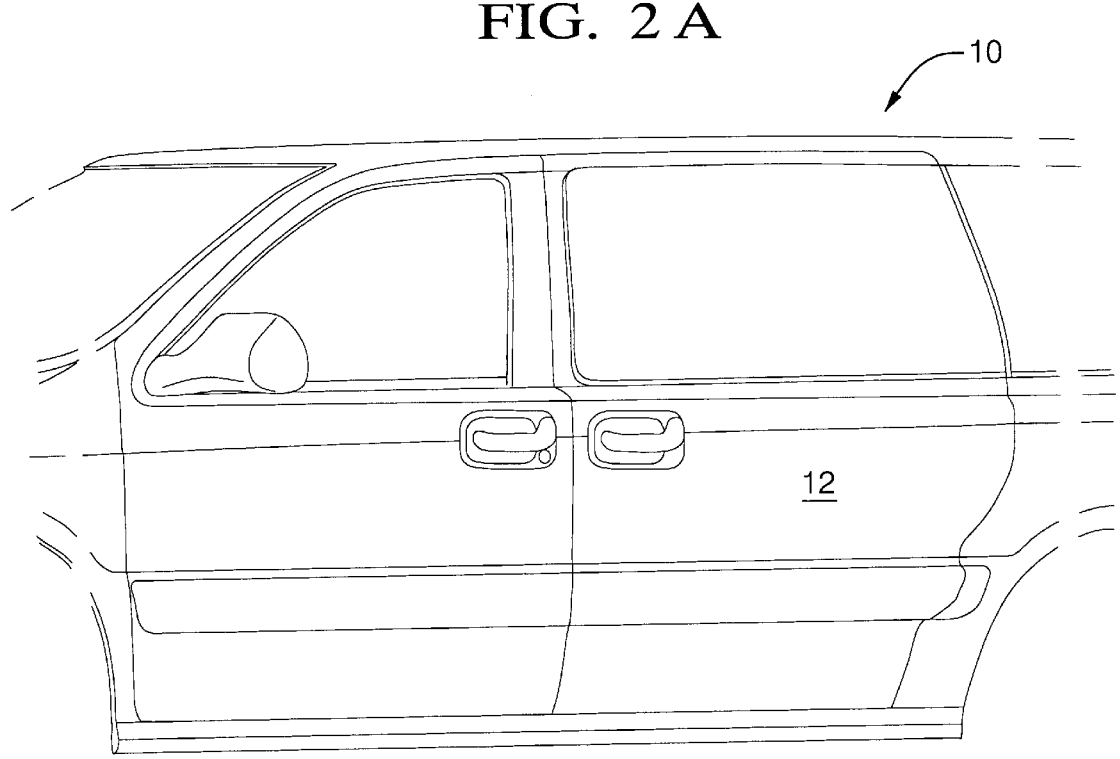

The method is implemented in connection with a vehicle generally indicated at 10 having a door 12 that can be cinched shut from a secondary position (i.e. partially-latched) to a primary position (i.e. fully-latched) with a cinching mechanism 14, 14'. FIGS. 1 and 2 illustrate this well-known cinching operation to the extent that they show a fork bolt 18 engaging a striker 20, and a detent 22 retaining the fork bolt 18 in either the secondary position or the primary position. In the secondary position the fork bolt 18 engages a striker 20 and retains the striker in a partially-latched condition. This is shown in FIG. 1A. The fork bolt 20 is retained in this position by the detent 22. The striker cannot be released and the door cannot be unlatched until the detent 22 releases the fork bolt. Still, it is desirable in most cases to have the latch in the primary or fully-latched condition as shown in FIG. 1B. Here, the fork bolt 18 has rotated further and the detent 22 engages the fork bolt as shown. FIG. 2A shows how the door 12 might appear in the secondary position, while FIG. 2B shows how it might appear in the primary condition.

In one embodiment, the cinching is performed with a power sliding door assembly 14 wherein a cable drive pulls on a cable 16 which eventually drives the door 12 from the secondary position to the primary position. This arrangement is shown in a very simplified manner in FIG. 4. The exact type of power sliding door arrangement is not critical to the invention, and no specific type is preferred. Examples are shown in several United States Patents, including those having numbers U.S. Pat. Nos. 5,138,795; 5,316,365; 5,434, 487; 5,263,762; 5,350,986; and 5,396,158. The teachings of these patents are incorporated herein by reference.

In another possible embodiment, the cinching may be effected by a dedicated cinching mechanism 14' that has the sole purpose of cinching a door closed once the door is placed in the secondary position though manual or other means. In such a mechanism 14', there is some connection between a cinching cable 16' and the fork bolt 18. The connection between the cable 16' and the fork bolt 18 is shown in FIGS. 1A and 1B in a simplified schematic manner. The actual manner of connection is not critical to the invention. In one possible embodiment, the connection involves a more complicated indirect connection between the cable 16' and the fork bolt 18. The embodiment having the indirect connection, manufactured by Delphi Automotive Systems, is widely used in many vehicles, including vehicles manufactured by the General Motors Corporation. A direct connection as shown is also possible. Various possibilities are shown in several United States Patents on cinching mechanisms that are assigned to the General Motors Corporation, or to Delphi Automotive Systems.

Figure 5:
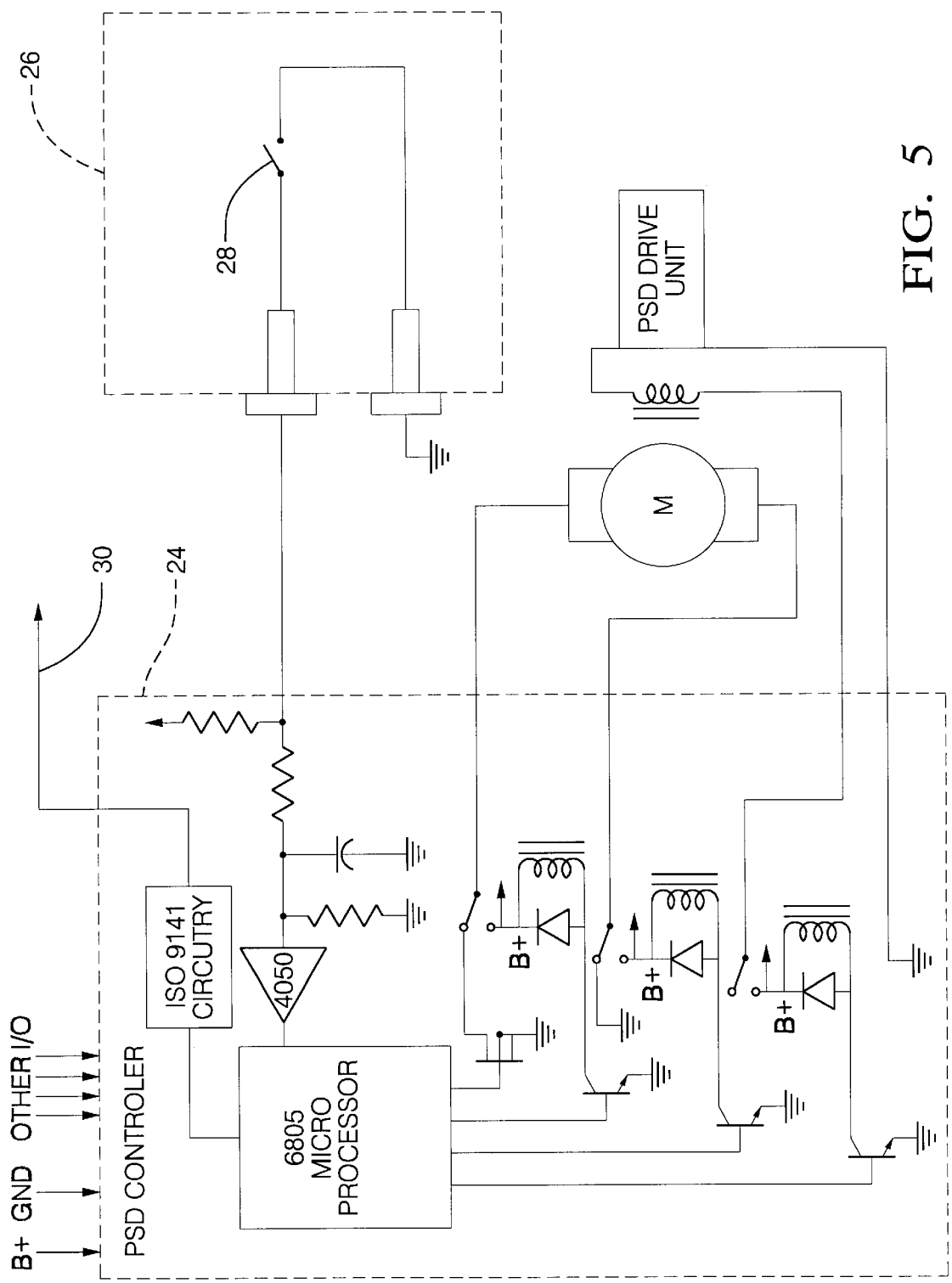
FIG. 5 is an electrical schematic of an example of a power sliding door controller and related components.

In the first-mentioned embodiment, the method is implemented in connection with the circuits schematically illustrated in FIG. 5. These circuits are on the vehicle 10, and they relate to a power sliding door closing feature. According to FIG. 5, a controller circuit 24 interfaces with a door circuit 26. During a cinching operation, the controller 24 monitors a detent switch signal from a detent switch 28 located near the door latch. This detent switch 28 is part of the door circuit 26. By monitoring the detent switch 28, the controller 24 determines when to apply full power to the drive motor to cinch the door 12, and when to shut off the motor and clutch when the door is fully closed into the primary latch position. The circuit 24 also includes a diagnostic communication line leading to an access point 32 on the vehicle 10. In this manner, technical personnel can plug a remote diagnostic computer 34 into the access point 32 to communicate with the controller 24.

The method for determining whether the sealing force exceeds a maximum limit includes the following steps: 1) determining a maximum cinching time corresponding to a predetermined maximum tolerable sealing force for cinching a vehicle door type from a partially-latched position to a fully-latched position; 2) determining the time necessary to cinch the particular vehicle door 12 from a partially-latched position to a fully-latched position; 3) comparing the determined time with the maximum cinching time that corresponds to the predetermined maximum force; and 4) generating an output indicating if the determined time exceeds the maximum cinching time.

Each step of the method will now be discussed in detail. The method actually assumes several preliminary steps. One of these is determining the maximum tolerable sealing force for cinching a vehicle door type from the secondary to primary positions. This force will vary somewhat with the type of cinching mechanism used (e.g. cable), and the type of door used The maximum tolerable force may further vary depending on the designer's objectives.

For example, the objective may be to ensure that the door 12 can still be cinched even in less than ideal battery and motor conditions. In this situation, the maximum tolerable force corresponds to the force that the cinching mechanism can produce if the battery and motor fall into these less than ideal conditions (e.g. hot motor and 10.5 volts). These conditions may be specified by the vehicle manufacturer. In this case, the maximum tolerable force is determined experimentally by measuring the force on the cable 16, 16' when the motor and battery are in these conditions. The force is measured by known and conventional methods.

Another objective may be to ensure that the force necessary to cinch does not unduly shorten the cable cycle life. If the necessary force is consistently too high, this can happen. Here again, the maximum tolerable force is determined experimentally.

Another step is to correlate a cinching time with this force. This step of correlating time and cinching force can be performed before or after the step of determining the maximum tolerable sealing force. The correlating step is performed experimentally by measuring the sealing forces and time on a significant number of vehicles. These measured values for force and time can be plotted on a graph, and a line can be fit statistically to closely approximate the correlation between force and time.

It has been observed that time rises linearly with force. Once the line is fitted—and this can be done with commercially available software, one can determine what time corresponds to a given force level without needing to actually measure the time. Alternatively, one can determine what force corresponds with a given cinching time without needing to actually measure the force.

In this manner, the maximum cinching time can then be determined from the chart thus created.

Figure 3:
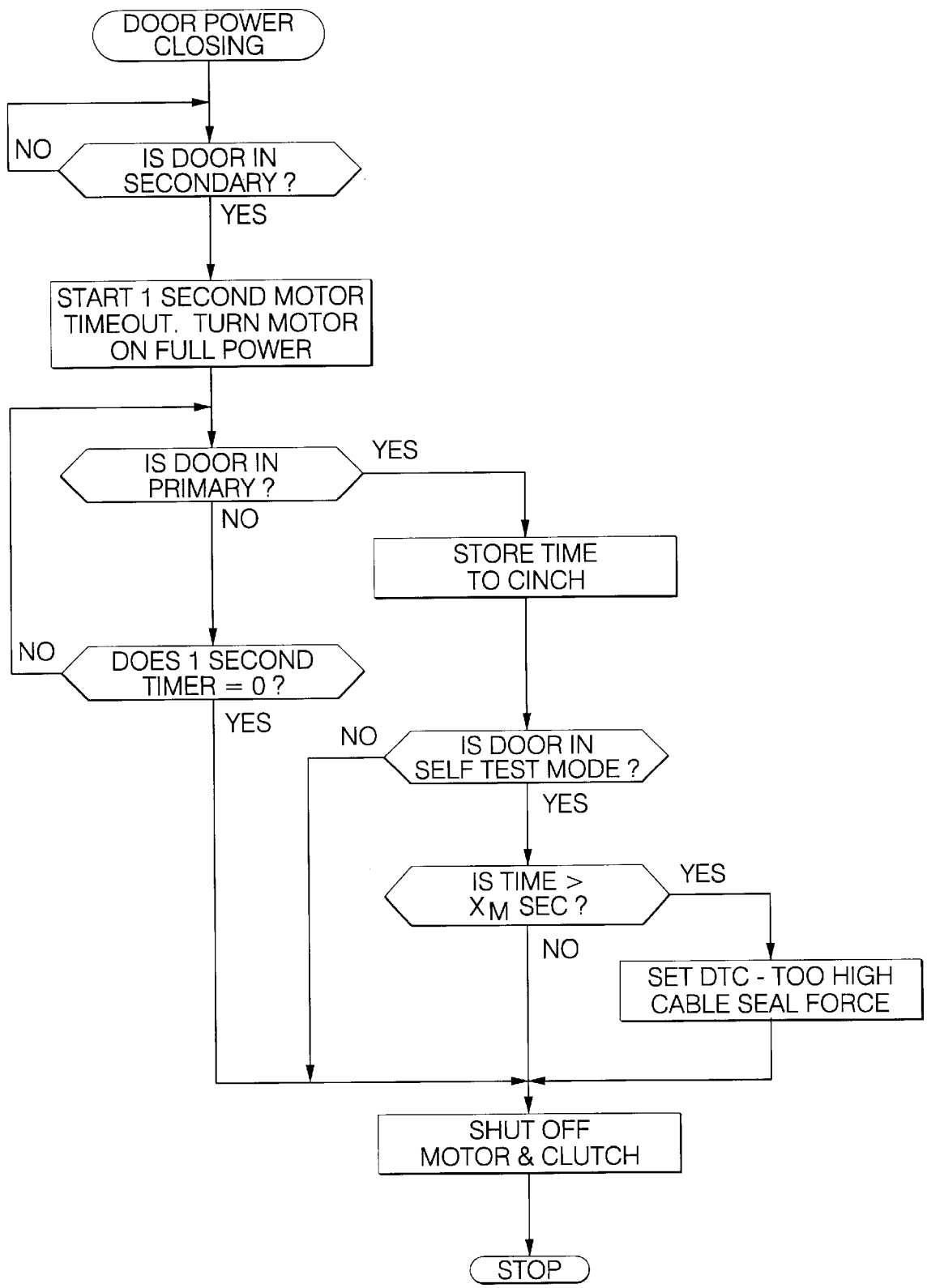
FIG. 3 is a flow chart showing the operations performed by the inventive methods.

The next step is to measure the time necessary to cinch the particular door 12 being tested. This routine is illustrated with the flow chart of FIG. 3. According to the preferred method, this routine is performed by the controller 24 shown in FIG. 5. As noted earlier, the controller 24 monitors the detent switch 28. When the door 12 moves from a fully-opened position to a secondary latched position, the detent switch signal moves from 12 volts to 0 volts and then back to 12 volts. The controller 24 senses this and starts two operations. It starts the motor on to full power, and it starts a timer counting from 1 second backward down to zero. During this time the controller 24 continues to monitor the detent switch 28. When the signal from the switch 28 goes from 12 volts to 0 volts and back to 12 volts again, the controller 24 learns that the cable 16 has cinched the door 12 into the primary position. At this point the controller 24 stops the motor, stops the timer, and stores the cinching time in memory.

Figure 4:
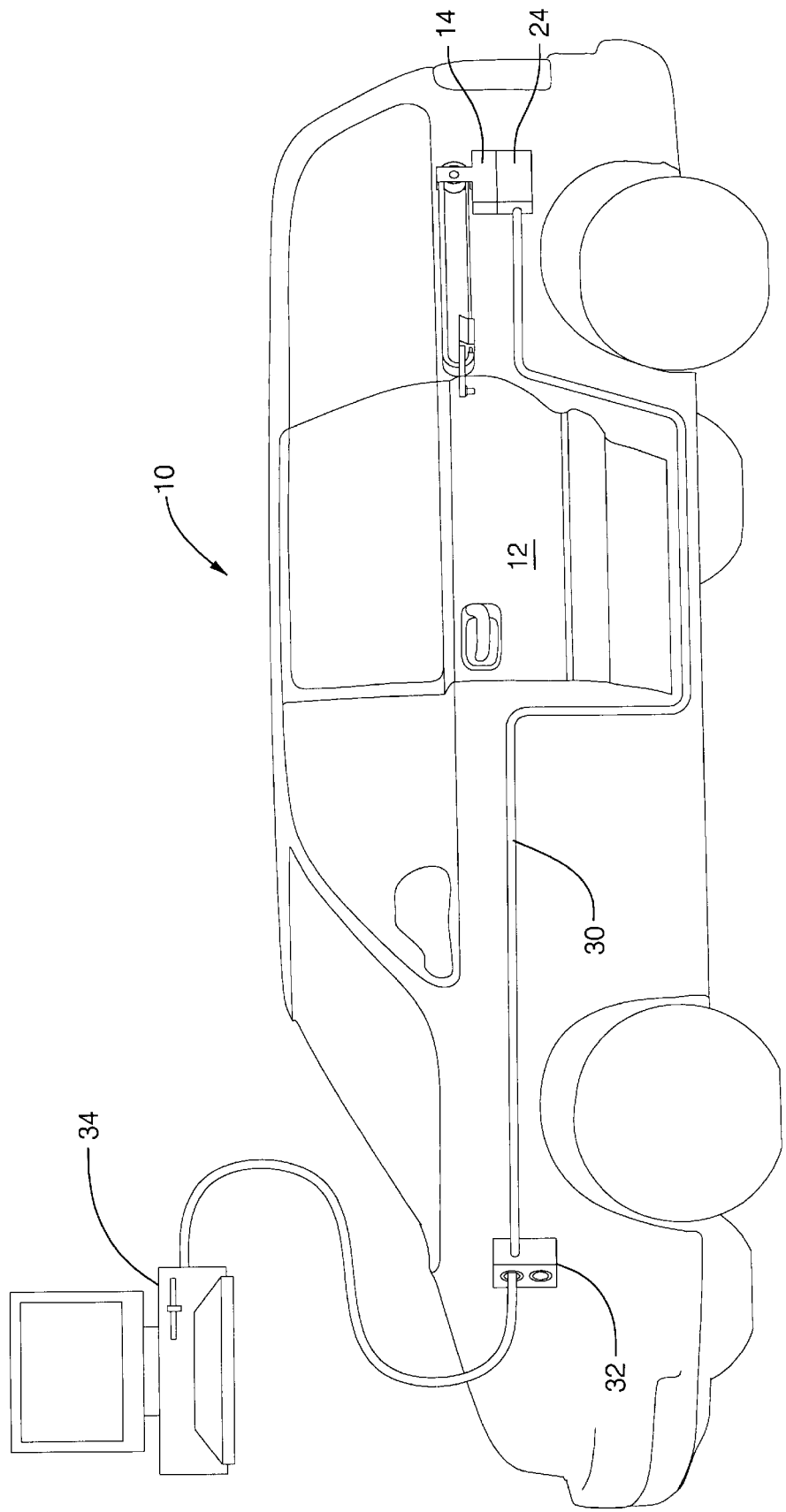
FIG. 4 is a schematic view of a van showing a simplified power sliding door assembly, as well as the location of the on-board door controller and the general manner in which a remote diagnostic computer is connected to the on-board controller.

The next step is to compare the measured and stored cinching time with the predetermined maximum cinching time. This step is performed in the self-test mode—e.g. where the diagnostic computer 34 is plugged into the vehicle 10 as shown in FIG. 4.

The next step is to generate an output if the measured and stored cinching time exceeds the maximum cinching time. This can occur in the form of a human-readable messages on the diagnostic computer 34. The message can indicate something to the effect that the cable sealing force is too high.

A final possible step is to adjust the trim on the door 12 and the vehicle 10, or perform other adjustments to the vehicle 10 to lower the force necessary to cinch the door 12 closed.

The method is implemented in software programmed into a controller 24 that is already resident on the vehicle 10 to control the cinching operation. The steps of comparing and generating are performed by the controller 24 that is already in the vehicle 10. This is also true of the steps of determining and storing.

The diagnostic computer 34 is programmed with code enabling communication with the controller 24 when the diagnostic computer is plugged into the vehicle 10.

We claim:

1. A method for cinching a vehicle door from a partially-latched position to a fully-latched position with a cable cinching mechanism including the steps of:
   placing the door in the partially-latched position;
   cinching the door to the fully-latched position with a cable cinching mechanism;
   determining the time necessary to cinch the door from the partially-latched position to the fully-latched position;
   comparing the determined time with a predetermined maximum time corresponding to a predetermined maximum cable sealing force; and
   generating an output if the determined time exceeds the maximum time.

2. The method as set forth in claim 1 further including the step of adjusting the door fit.

3. The method as set forth in claim 1 wherein the step of determining the time includes the steps of: sensing when the door is in the partially-latched position; starting a timer; sensing when the door is in the fully-latched position; and ending the timer when the door reaches the fully-latched position.

4. The method of claim 1 including the step of storing the determined time prior to performing the step of comparing the determined time with the predetermined maximum time.

5. The method of claim 4 wherein the steps of comparing and generating are performed by a computer disposed in the vehicle.

6. The method of claim 5 wherein the steps of determining and storing are performed by a computer disposed in the vehicle.

7. A method for determining whether the sealing force for a particular vehicle door cinching mechanism exceeds a maximum limit, the method including the steps of:
   determining a maximum cinching time corresponding to a predetermined maximum tolerable sealing force for cinching a vehicle door type from a partially-latched position to a fully-latched position;
   determining the time necessary to cinch the particular vehicle door from a partially-latched position to a fully-latched position;
   comparing the determined time with the maximum cinching time that corresponds to the predetermined maximum tolerable sealing force; and
   generating an output indicating if the determined time exceeds the maximum cinching time.

8. The method as set forth in claim 7 wherein the cinching mechanism is a cable cinching mechanism.

9. A method for determining whether the sealing force for a particular vehicle door cinching mechanism exceeds a maximum limit, the method including the steps of:
   determining a maximum tolerable sealing force for cinching a particular door type from a partially-latched position to a fully-latched position;
   correlating the time necessary to cinch the door type from the partially-latched position to the fully-latched position with the force necessary to cinch the door type from the partially-latched position to the fully-latched position;
   determining a maximum time that corresponds to the maximum tolerable sealing force;
   determining the time necessary to cinch the particular vehicle door from a partially-latched position to a fully-latched position;
   comparing the determined time with the determined maximum time that corresponds to the determined maximum tolerable sealing force; and
   generating an output indicating if the determined time exceeds the determined maximum time.

* * * * *